(12) United States Patent
Wu et al.

(10) Patent No.: US 7,839,885 B2
(45) Date of Patent: Nov. 23, 2010

(54) CONNECTION MEMORY FOR TRIBUTARY TIME-SPACE SWITCHES

(75) Inventors: Ephrem C. Wu, San Mateo, CA (US); Wei-Je Huang, Fremont, CA (US)

(73) Assignee: LSI Corporation, Milpitas, CA (US)

( * ) Notice: Subject to any disclaimer, the term of this patent is extended or adjusted under 35 U.S.C. 154(b) by 1171 days.

(21) Appl. No.: 11/113,617

(22) Filed: Apr. 25, 2005

(65) Prior Publication Data
US 2006/0239262 A1    Oct. 26, 2006

(51) Int. Cl.
H04J 3/16    (2006.01)
(52) U.S. Cl. ........................ 370/458; 370/462
(58) Field of Classification Search ................ 370/389, 370/392, 458, 462
See application file for complete search history.

(56) References Cited

U.S. PATENT DOCUMENTS

| | | | | |
|---|---|---|---|---|
| 5,134,614 A * | 7/1992 | Baydar et al. | ........... | 370/522 |
| 5,182,744 A * | 1/1993 | Askew et al. | ........... | 370/228 |
| 5,265,090 A * | 11/1993 | Guinand et al. | ........... | 370/377 |
| 5,331,639 A * | 7/1994 | Takatori et al. | ........... | 370/506 |
| 5,642,357 A * | 6/1997 | Suzuki et al. | ........... | 370/505 |
| 5,717,693 A * | 2/1998 | Baydar et al. | ........... | 370/514 |
| 5,777,998 A * | 7/1998 | Traverso et al. | ........... | 370/509 |
| 6,614,811 B1 * | 9/2003 | Alaimo et al. | ........... | 370/498 |
| 6,674,752 B1 * | 1/2004 | Colizzi et al. | ........... | 370/372 |
| 6,781,985 B1 * | 8/2004 | Feder et al. | ........... | 370/376 |
| 6,891,863 B1 * | 5/2005 | Penkler et al. | ........... | 370/539 |
| 7,079,555 B2 * | 7/2006 | Baydar et al. | ........... | 370/532 |
| 7,239,651 B2 * | 7/2007 | Gilsdorf | ........... | 370/503 |
| 7,254,207 B2 * | 8/2007 | Bleisteiner et al. | ........... | 375/372 |
| 7,362,778 B2 * | 4/2008 | Wolf | ........... | 370/503 |
| 7,430,202 B2 * | 9/2008 | Wu | ........... | 370/375 |
| 2001/0047458 A1 * | 11/2001 | Iizuka | ........... | 711/154 |
| 2002/0080445 A1 * | 6/2002 | Falkenstein et al. | ........... | 359/127 |
| 2002/0191724 A1 * | 12/2002 | Bleisteiner et al. | ........... | 375/372 |
| 2005/0030943 A1 * | 2/2005 | Wu | ........... | 370/375 |
| 2005/0068988 A1 * | 3/2005 | Jarabek et al. | ........... | 370/506 |
| 2005/0163162 A1 * | 7/2005 | Lanzone et al. | ........... | 370/471 |
| 2006/0056417 A1 * | 3/2006 | Chatterjee | ........... | 370/395.3 |
| 2006/0153179 A1 * | 7/2006 | Ho et al. | ........... | 370/386 |
| 2006/0165003 A1 * | 7/2006 | Partridge | ........... | 370/248 |
| 2006/0239262 A1 * | 10/2006 | Wu et al. | ........... | 370/389 |

FOREIGN PATENT DOCUMENTS

EP    570877 A1 * 11/1993
EP    720320 A2 *  7/1996

* cited by examiner

*Primary Examiner*—Salman Ahmed
(74) *Attorney, Agent, or Firm*—Christopher P. Maiorana, PC (57) ABSTRACT

A method of switching a plurality of tributaries disposed among a plurality of time slots in a frame is disclosed. The method generally includes the steps of (A) buffering the frame, (B) switching the tributaries among the time slots in response to a read address and (C) generating the read address in response to a plurality of identifications in a connection map, the connection map defining (i) at most one of the identifications for each of the tributaries and (ii) one of the identifications for each of the time slots carrying other than the tributaries.

25 Claims, 10 Drawing Sheets

TABLE III

| VT/TU SWITCHING UNIT ID | DESCRIPTION |
| --- | --- |
| 0 | COLUMN 1 OF AN STS-1/STM-0 FRAME |
| 1 | COLUMN 2 OF AN STS-1/STM-0 FRAME |
| 2 | COLUMN 3 OF AN STS-1/STM-0 FRAME |
| 3 | COLUMN 4 OF AN STS-1/STM-0 FRAME (ASSUMED TO BE THE STS-1 PATH OVERHEAD COLUMN, THE VC-4 PATH OVERHEAD COLUMN, OR FIXED COLUMNS IN TRAILING STS-1s IN A CONCATENATED SONET FRAME OR VC-4 STRUCTURED FRAMES) |
| 4-31 | $4k$ TO $4k+1, k = 1, 2, ..., 7$<br>SONET: $4k + i$: $(i+1)$st VT 1.5 in VT GROUP $k$, FOR $i = 1, 2, 3, 4$ and $4k + i$: $(i+1)$st VT2 IN VT GROUP $k$, FOR $i = 1, 2, 3$. TREAT A VT3 AS TWO VT1.5s AND A VT6 AS TWO VT2s.<br>SDH: $4k + i$: $(i+1)$st TU-11 IN THE $k$th TUG-2, FOR $i = 1, 2, 3, 4$ and $4k + i$: $(i+1)$st TU-12 in the $k$th TUG-2, FOR $i = 1, 2, 3$. TREAT A TU-2 AS TWO TU-12s. |
| 32 | FIRST FIXED STUFF COLUMN<br>SONET: COLUMN 33 IN AN STS-1 FRAME<br>SDH: COLUMN 5 IN AN STM-0 FRAME FOR VC-4 STRUCTURED FRAMES AND COLUMN 33 IN AN STM-0 FRAME FOR VC-3 STRUCTURED FRAMES |
| 33 | SECOND FIXED STUFF COLUMN<br>SONET: COLUMN 62 IN AN STS-1 FRAME<br>SDH: COLUMN 6 IN AN STM-0 FRAME FOR VC-4 STRUCTURED FRAMES AND COLUMN 62 IN AN STM-0 FRAME FOR VC-3 STRUCTURED FRAMES |

FIG. 8

TABLE IV

| BIT LOCATION | DESCRIPTION |
| --- | --- |
| $1 \leq i \leq 7$ | SONET<br>0: VT GROUP $i$ CARRIES VT1.5s OR VT3s<br>1: VT GROUP $i$ CARRIES VT2s OR VT6s<br>SDH<br>0: THE $i$th TUG-2 CARRIES TU-11s<br>1: THE $i$th TUG-2 CARRIES TU-12s or TU-2s |
| 0 | 0: FIXED STUFF IN COLUMNS 33 AND 62<br>1: FIXED STUFF IN COLUMNS 4 AND 5 |

FIG. 9

TABLE V

| VT/TU SWITCHING UNIT ID | DESCRIPTION |
| --- | --- |
| 0 | COLUMN 1 OF AN STS-1/STM-0 FRAME |
| 1 | COLUMN 2 OF AN STS-1/STM-0 FRAME |
| 2 | COLUMN 3 OF AN STS-1/STM-0 FRAME |
| 3 | COLUMN 4 OF AN STS-1/STM-0 FRAME (ASSUMED TO BE THE STS-1 PATH OVERHEAD COLUMN, THE VC-4 PATH OVERHEAD COLUMN, OR FIXED COLUMNS IN TRAILING STS-1s IN A CONCATENATED SONET FRAME OR VC-4 STRUCTURED FRAMES) |
| 4-31 | $4k$ TO $4k+3, k = 1, 2, ..., 7$<br>SONET: $4k + i$: $(i+1)$st VT 1.5 in VT GROUP $k$, FOR $i = 1, 2, 3, 4$ and $4k + i$: $(i+1)$st VT2 IN VT GROUP $k$, FOR $i = 1, 2, 3$. TREAT A VT3 AS TWO VT1.5s AND A VT6 AS TWO VT2s.<br>SDH: $4k + i$: $(i+1)$st TU-11 IN THE $k$th TUG-2, FOR $i = 1, 2, 3, 4$ and $4k + i$: $(i+1)$st TU-12 in the $k$th TUG-2, FOR $i = 1, 2, 3$. TREAT A TU-2 AS TWO TU-12s.<br>(STUFFED COLUMN SWITCHING PROHIBITED) |

CONNECTION MAP $< 180QN\lceil LOG_2 90PN \rceil$ BITS

TABLE VI

| VT/TU SWITCHING UNIT ID | DESCRIPTION |
|---|---|
| 0 | COLUMNS 1, 2 AND 3 (TOH) OF AN STS-1/STM-0 FRAME |
| 3 | COLUMN 4 OF AN STS-1/STM-0 FRAME (ASSUMED TO BE THE STS-1 PATH OVERHEAD COLUMN, THE VC-4 PATH OVERHEAD COLUMN, OR FIXED COLUMNS IN TRAILING STS-1s IN A CONCATENATED SONET FRAME OR VC-4 STRUCTURED FRAMES) |
| 4-31 | $4k$ TO $4k+3, k = 1, 2, ..., 7$<br>SONET: $4k + i$. $(i+1)$st VT 1.5 in VT GROUP $k$, FOR $i = 1, 2, 3, 4$ and $4k + i$. $(i+1)$st VT2 IN VT GROUP $k$, FOR $i = 1, 2, 3$. TREAT A VT3 AS TWO VT1.5s AND A VT6 AS TWO VT2s. SDH: $4k + i$. $(i+1)$st TU-11 IN THE $k$th TUG-2, FOR $i = 1, 2, 3, 4$ and $4k + i$. $(i+1)$st TU-12 in the $k$th TUG-2, FOR $i = 1, 2, 3$. TREAT A TU-2 AS TWO TU-12s. |

FIG. 12

TABLE VII

| VT/TU SWITCHING UNIT ID | DESCRIPTION |
|---|---|
| 0 | COLUMNS 1, 2 AND 3 (TOH), AND COLUMN 4 (ASSUMED TO BE THE STS-1 PATH OVERHEAD COLUMN, THE VC-4 PATH OVERHEAD COLUMN, OR FIXED COLUMNS IN TRAILING STS-1s IN A CONCATENATED SONET FRAME OR VC-4 STRUCTURED FRAMES) OF AN STS-1/STM-0 FRAME |
| 4-31 | $4k$ TO $4k+3, k = 1, 2, ..., 7$<br>SONET: $4k + i$. $(i+1)$st VT 1.5 in VT GROUP $k$, FOR $i = 1, 2, 3, 4$ and $4k + i$. $(i+1)$st VT2 IN VT GROUP $k$, FOR $i = 1, 2, 3$. TREAT A VT3 AS TWO VT1.5s AND A VT6 AS TWO VT2s. SDH: $4k + i$. $(i+1)$st TU-11 IN THE $k$th TUG-2, FOR $i = 1, 2, 3, 4$ and $4k + i$. $(i+1)$st TU-12 in the $k$th TUG-2, FOR $i = 1, 2, 3$. TREAT A TU-2 AS TWO TU-12s. |

FIG. 13

CONNECTION MEMORY FOR TRIBUTARY TIME-SPACE SWITCHES

FIELD OF THE INVENTION

The present invention relates to time-space switches generally and, more particularly, to a connection memory for tributary time-space switches.

BACKGROUND OF THE INVENTION

Transport network standards, such as the Synchronous Optical Network (SONET) and the Synchronous Digital Hierarchy (SDH), are used in time division multiplexed (TDM) networks in which link capacity is evenly divided temporally for efficient bandwidth management. The lowest bandwidth, or most granular, "high-order" switching unit of a SONET frame is a Synchronous Transport Signal, level-1 (STS-1) frame. Each STS-1 frame comprises nine rows of 90-columns transmitted in 125 microseconds (μs). As such, the STS-1 frame rate is 51.84 million bits per second (Mbps). Multiple SONET STS-1 frames can be multiplexed together to form higher rate frames. Currently, the defined SONET frame rates are STS-1, STS-3, STS-12, STS-48, STS-192, and STS-768. Some SONET frame designations have an appended "c" that indicates payload concatenation. An STS-N frame and a STS-Nc frame have the same frame rate, where N is 1, 3, 12, 48, 192, or 768.

In SDH, a Synchronous Transport Module, level-0 (STM-0) frame has the same frame rate and row-column structure as the SONET STS-1 frame. Higher levels of SDH frames are known as STM-N frames, where N can be 1, 4, 16, 64, and 256, corresponding to the same frame rates and row-column structures as SONET STS-3c, STS-12c, STS-48c, STS-192c, and STS-768c, respectively, as illustrated in TABLE I. The implementation of an STS-1/STM-0 time-space switch, also known as a SONET/SDH column switch, thus can treat the SONET columns and the SDH columns similarly.

TABLE I

| SONET Frame | SDH Frame | Format | | Frame Rate |
|---|---|---|---|---|
| | | Rows | Columns | (Kbps) |
| STS-1 | STM-0 | 9 | 90 | 51,840 |
| STS-3c | STM-1 | 9 | 270 | 155,520 |
| STS-12c | STM-4 | 9 | 1,080 | 622,080 |
| STS-48c | STM-16 | 9 | 4,320 | 2,488,320 |
| STS-192c | STM-64 | 9 | 17,280 | 9,953,280 |
| STS-768c | STM-256 | 9 | 69,120 | 39,813,120 |

A time-space switch with a lower level of switching granularity than STS-1/STM-0, however, may have to implement logic that distinguishes a SONET frame from an SDH frame. Each SONET STS-1 frame carries a payload in the synchronous payload envelope (SPE), which in turns carries "low-order" switching units know as virtual tributaries (VTs). In SDH, the low-order switching units are known as tributary units (TUs). TABLE II summarizes the frame sizes and rates for the virtual tributaries as follows:

TABLE II

| SONET Virtual Tributary (VT) | SDH Tributary Unit (TU) | Format | | Frame Rate (Kbps) |
|---|---|---|---|---|
| | | Rows | Columns | |
| VT1.5 | TU-11 | 9 | 3 | 1,728 |
| VT2 | TU-12 | 9 | 4 | 2,304 |
| VT3 | — | 9 | 6 | 3,456 |
| VT6 | TU-2 | 9 | 12 | 6,912 |

Existing tributary time-space switches use the following solutions: (1) a full-blown column switch and (ii) limited data formats. The full-blown column switch means that any SONET/SDH column can be switched to any other column. The full-blown column switch is costly to implement in silicon. The limited data format approach limits the arrangements allowed in a frame to accommodate the switching. Some conventional switches support the North American standard only (SONET) but not the European and Asian standard (SDH). Some conventional switches preformat incoming data to a supported format. Some conventional switches can process VT1.5 but not VT2 traffic, although both are part of the SONET standard.

SUMMARY OF THE INVENTION

The present invention concerns a method of switching a plurality of tributaries disposed among a plurality of time slots in a frame. The method generally comprises the steps of (A) buffering the frame, (B) switching the tributaries among the time slots in response to a read address and (C) generating the read address in response to a plurality of identifications in a connection map, the connection map defining (i) at most one of the identifications for each of the tributaries and (ii) one of the identifications for each of the time slots carrying other than the tributaries.

The objects, features and advantages of the present invention include providing a connection memory for tributary time-space switches that may (i) consume less memory space than a conventional connection memory, (ii) process all tributary standards defined in SONET, (iii) process all tributary standards defined in SDH, (iv) maximize switching bandwidth of a tributary time-space switch given a fixed amount of silicon area, (v) operate without incoming data preformatted to a particular format, (vi) use about ⅓rd of the connection memory bits compared with a conventional column switch and/or (vii) support column override.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
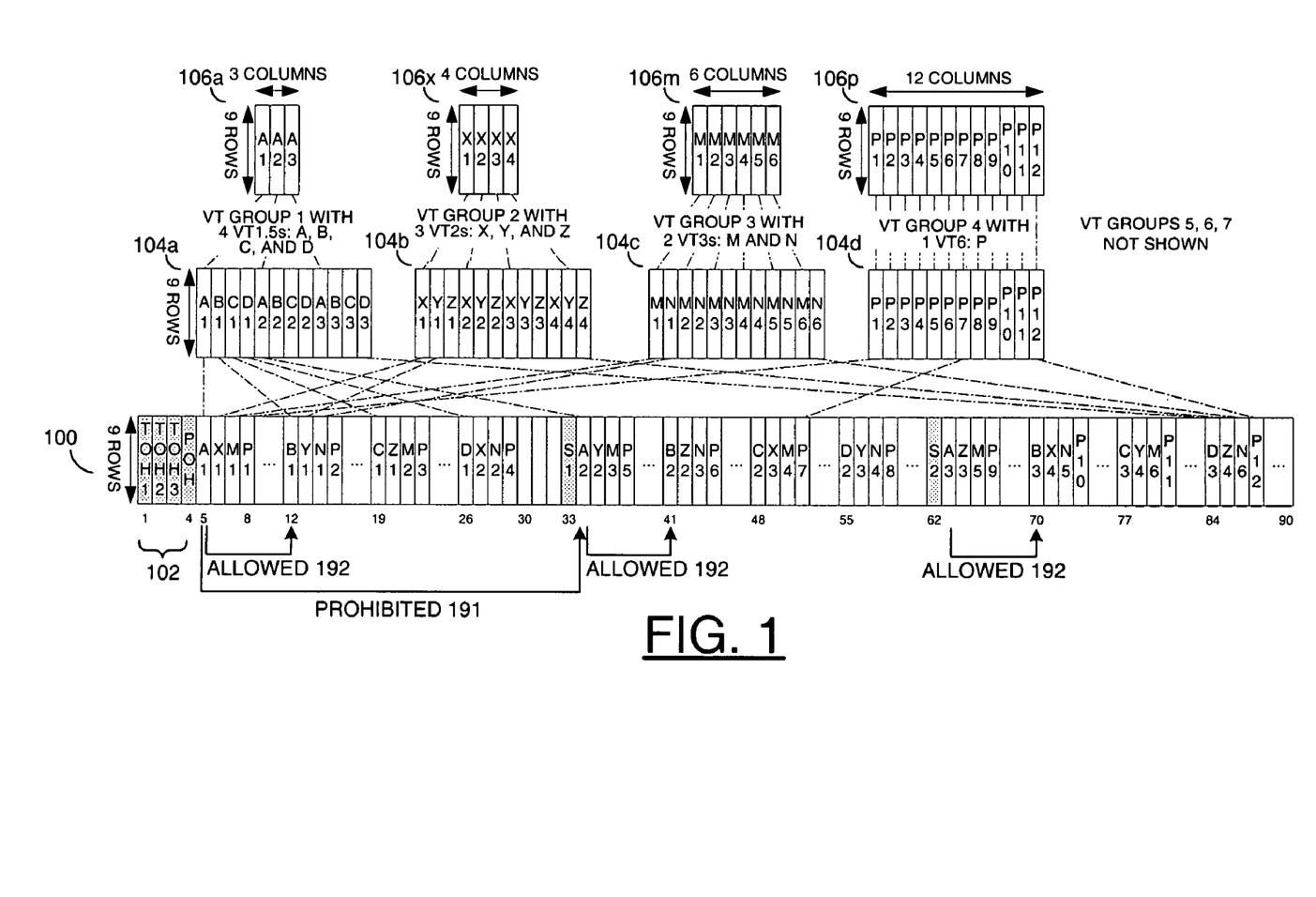
FIG. 1 is a diagram of an example virtual tributary structures in a Synchronous Optical Network frame in accordance with a preferred embodiment of the present invention.

Referring to FIG. 1, a diagram of an example virtual tributary (VT) structures in a Synchronous Optical Network (SONET) frame 100 is shown in accordance with a preferred embodiment of the present invention. The frame 100 is generally illustrated as a SONET Synchronous Transport Signal, level-1 (STS-1) frame. The SONET frame 100 generally comprises multiple (e.g., 90) columns (labeled left to right as columns 1-90). Each of the columns generally comprises multiple (e.g., 9) rows. Each row may have 90 bytes of data. The virtual tributaries may include VT1.5 tributaries, VT2 tributaries, VT3 tributaries and VT6 tributaries.

The first three columns in the 90-column STS-1 frame 100 are generally defined as transport overhead (TOH) columns 102. A path overhead (POH) column may be anywhere in a synchronous payload envelope (SPE) of the frame 100. The SPE generally comprises the rows from column 4 to column 90. For purposes of discussion, the POH column may be assumed to reside in column 4. Columns 33 and 62 may be referred to as fixed stuff (e.g., S1 and S2) columns and do not belong to any particular VT.

Each STS-1 frame 100 may carry seven VT groups 104a-104g (only VT groups 104a-104d are shown for clarity). The VT groups 104a-104g may be generically and individually referred to as a VT group 104. Each VT group 104 may occupy twelve columns and carry virtual tributaries (or "tributaries" for short) of the same type. Possible combinations that a VT group 104 may carry include, but is not limited to, four VT1.5 tributaries, three VT2 tributaries, two VT3 tributaries or one VT6 tributary. FIG. 1 generally illustrates mapping of the VT groups 104a-104g to into the frame 100.

Each VT group 104 generally comprises one or more individual virtual tributaries 106a-106z (only some individual VTs are shown for clarity). The VTs 106a-106z may be generically and individually referred to as a VT 106. A number of columns in each of the VTs 106 are generally provided in TABLE II above. In the example of FIG. 1, four individual VT1.5s 106a-106d may be disposed in the VT group 104a. Three VT2s 106x-106z may be disposed in the VT group 104b. Two VT3s 106m-106n may be disposed in the VT group 104c. One VT6 106p may be disposed in the VT group 104d. Other arrangements of VTs 106 and VT groups 104 may be implemented to meet the criteria of a particular application.

Figure 2:
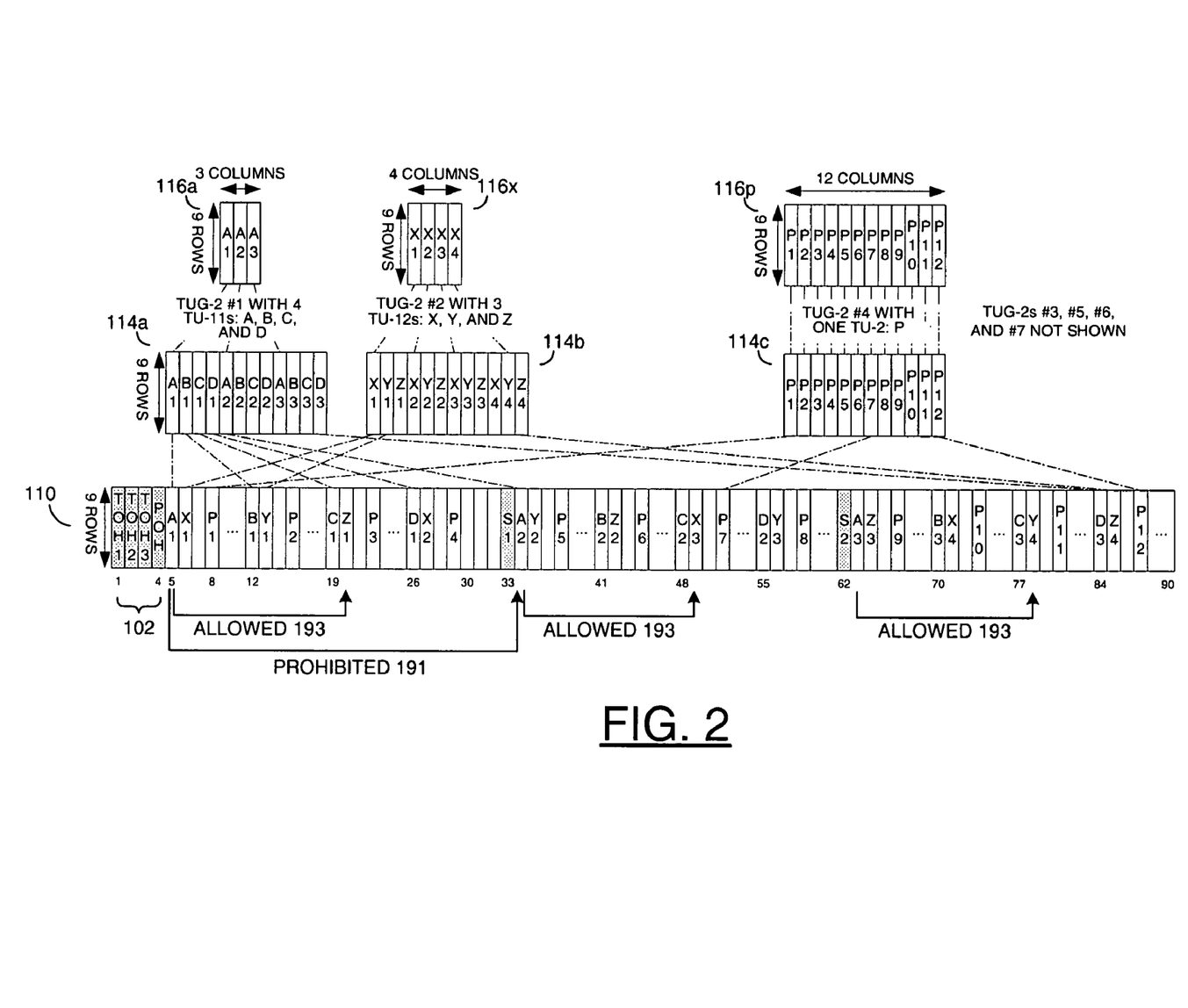
FIG. 2 is a diagram of example tributary unit structures in a Synchronous Digital Hierarchy frame.

Referring to FIG. 2, a diagram of an example tributary unit (TU) structures in a Synchronous Digital Hierarchy (SDH) frame 110 is shown. The frame 110 is generally illustrated as an SDH Synchronous Transport Module, level-0 (STM-0) frame. The SDH frame 110 generally comprises multiple (e.g., 90) columns (labeled left to right as columns 1-90). Each of the columns generally comprises multiple (e.g., 9) rows. Each row may have 90 bytes of data. The tributaries units may include TU-11 tributaries, TU-12 tributaries and TU-2 tributaries.

The tributary units are generally the SDH counterparts of the SONET VTs. According to the SDH standard, the TUs may be addressed much like VTs, with the exception that the fixed stuff columns may occupy either (i) columns 33 and 62 or (ii) columns 5 and 6 in an STM-0 frame. In particular, a tributary group 2 (e.g., TUG-2) in SDH may be similar to a VT group 104 in SONET. The above observations enable the VT/TU connectivity information to be compressed in a connection map of a tributary time-space switch circuit while allowing mixing both SONET VTs and SDH TUs in one switch.

The first three columns in the 90-column STM-0 frame 110 are generally defined as the transport overhead (TOH) columns 102. The path overhead (POH) column may be anywhere in a synchronous payload envelope (SPE) of the frame 100. The SPE generally comprises the rows from column 4 to column 90. For purposes of discussion, the POH column may be assumed to reside in column 4. Columns 33 and 62 or columns 5 and 6 may be referred to as the fixed stuff S1 and S2 columns and do not belong to any particular TU.

Each STM-0 frame 110 may carry seven TU groups 114a-114g (only TU groups 114a-114c are shown for clarity). The TU groups 114a-114g may be generically and individually referred as a TU group 114. Each TU group 114 may occupy twelve columns and carry tributary units (or "tributaries" for short) of the same type. Possible combinations that a TU group 114 may carry include four TU-11 tributaries, three TU-12 tributaries or one TU-2 tributary. FIG. 2 generally illustrates mapping of the TU groups 114 to into the frame 110.

Each TU group 114 generally comprises one or more individual tributary units 116a-116z (only some individual TUs are shown for clarity). The TUs 116a-116z may be generically and individually referred to as a TU 116. A number of columns in each of the TUs 116 are generally provided in TABLE II above. In the example of FIG. 2, four individual TU-11s 116a-116d may be disposed in the TU group 114a. Three TU-12s 116x-116z may be disposed in the TU group 114b. One TU-2 116p may be disposed in the TU group 114c. Other arrangements of TUs 116 and TU groups 114 may be implemented to meet the criteria of a particular application.

Being able to cost-effectively manage bandwidth at the tributary level is generally more advantageous to service providers than at the less granular STS-1/STM-0 frame level. For instance, T1 traffic may be mapped onto one VT1.5 and an STS-1 payload may carry up to 28 such tributaries (or streams). Similarly, a 10BaseT Ethernet connection (10 Mbps) may be mapped onto seven VT1.5s and an STS-1 may therefore carry 4 such connections. Tributary time-space switching thus increases bandwidth utilization compared with bandwidth management at the STS-1/STM-0 level.

To simplify system design, a tributary time-space switch of the present invention may be able to switch any mix of the tributaries listed in TABLE II. Without such a capability in the tributary time-space switch the system would, for instance, have to convert one tributary format to another solely for switching purposes. For instance, the system might convert a VT1.5 into a VT2 by stuffing the VT1.5 and passing the resulting VT2 to a tributary time-space switch capable of switching VT2s only. Similarly, a tributary time-space switch may also be able to switch SONET and SDH tributaries.

Figure 3:
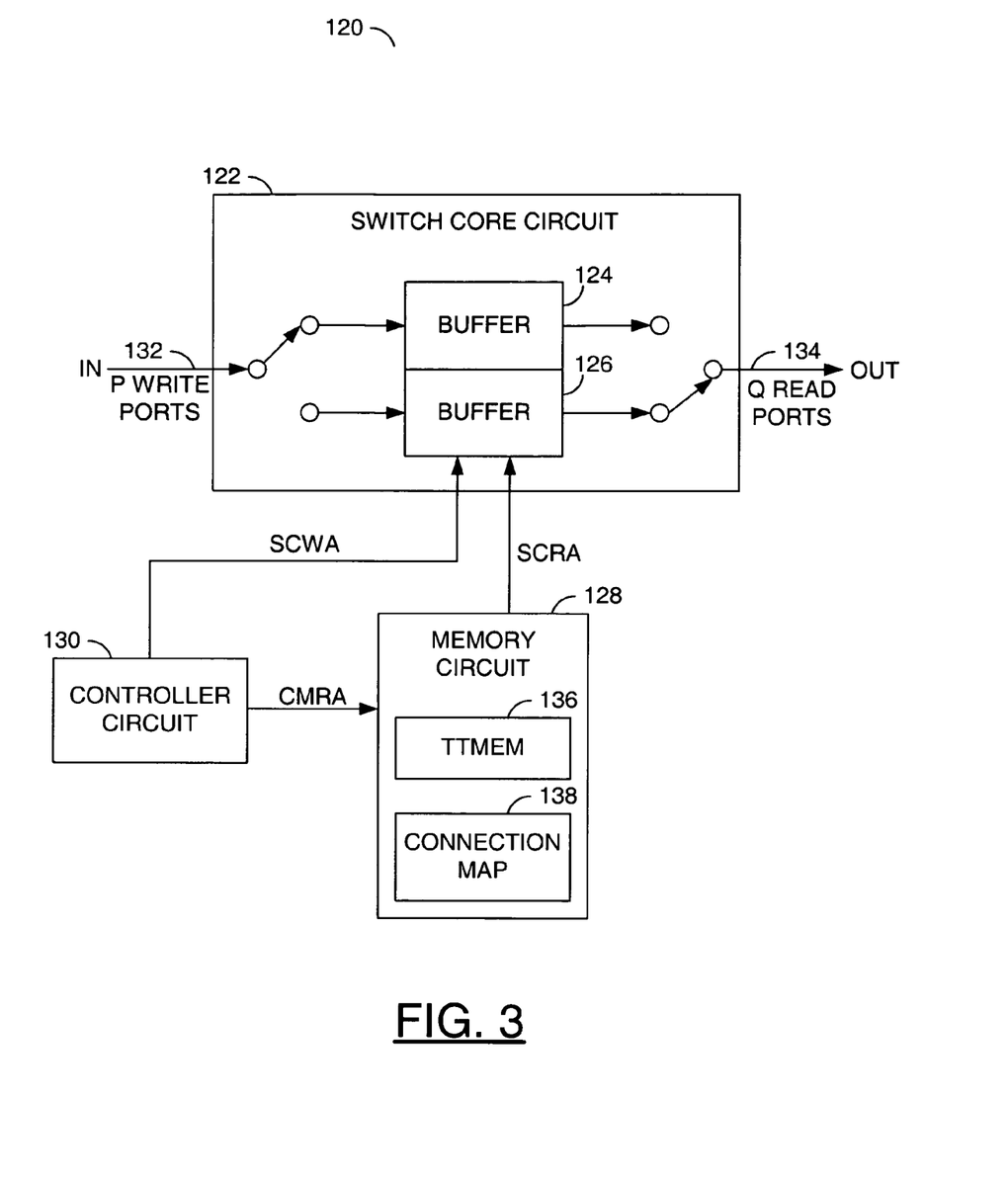
FIG. 3 is a block diagram of an example implementation of a first system.

Referring to FIG. 3, a block diagram of an example implementation of a first system 120 is shown. The system (or circuit) 120 may be referred to as a tributary time-space switch, or switch for short. The switch 120 may be configured to groom traffic from a number (e.g., P) STS-N streams (where N is 1, 3, 12, 48, 192, or 768) with column granularity in an unrestricted non-blocking fashion. As such, some of the input columns may be switched in both space and time.

The time-space switch 120 generally comprises a switch core circuit (or module) 122, a memory circuit (or module) 128 and a controller circuit (or module) 130. A signal (e.g., IN) may be received by the switch core circuit 122 at an input port 132. A signal (e.g., OUT) may be presented at an output port 134 of the switch core circuit 122. A signal (e.g., SCWA) may be presented from the controller circuit 130 to the switch core circuit 122. A signal (e.g., CMRA) may be presented from the controller circuit 130 to the memory circuit 128. A signal (e.g., SCRA) may be presented from the memory circuit 128 to the switch core circuit 122.

The signal SCWA may be referred to as a switch core write address signal. The signal SCWA may carry write address values to the switch core circuit 122 identifying where to write the individual columns of an incoming frame 100/110 in the signal IN.

The signal SCRA may be referred to as a switch core read address signal. The signal SCRA may carry read address values to the switch core circuit 122 identifying a particular one of the individual columns of a stored frame 100/110 to read via the signal OUT.

The signal CMRA may be referred to as a connection map read address signal (or a counter signal). The signal CMRA may carry read addresses (or a column counter) to the memory circuit 128 identifying a particular connection map value to be used in generating the read address in the signal SCRA.

The switch core circuit 122 generally comprises a buffer circuit (or module) 124 and a buffer circuit (or module) 126. The buffer circuits 124 and 126 may be similar to each other. Each of the buffer circuits 124 and 126 may be capable of storing P rows of STS-N data (e.g., 90PN bytes). Each buffer circuit 124 and 126 generally alternates between being a read buffer and a write buffer for 90N byte cycles, where one buffer may be the read buffer while the other one may be the write buffer. To achieve the time-space switching function, as data from a current row is filling the write buffer sequentially per the signal SCWA, data from a previous row may be read from the read buffer according to an order specified in the signal SCRA.

The memory circuit 128 may be configured to store a Tributary Type Memory (TTMEM)(or module) 136 and a connection map (or module) 138. The TTMEM 136 and the connection map 138 generally serve as a generator for the switch core read address values in the signal SCRA. The switch core read addresses, in turn, is generally indexed by the output column counter addresses generated by the controller circuit 130 in the signal CMRA. The TTMEM 136 generally stores tributary type information used in routing the VTs and TUs. The connection map 138 generally stores switching information also used in routing the VTs and TUs.

The switch core circuit 122, generally has P input (write) ports 132 and Q output (read) ports 134. The P input ports 132 may be logically configured as a single write port of 8P bits wide. The Q output ports 134 may be logically configured as Q read ports, each 8 bits wide.

Physical implementation issues may limit the number of read ports 134 of each switch core circuit 122 to have fewer than Q read ports 134. For example, each switch core circuit 122 may have K read ports 134. Therefore, M=⌈Q/K⌉ copies of the K-read-port-one-write-port switch core circuit 122 may be implemented to produce Q read ports 134. The function ⌈x⌉ generally returns a smallest integer greater than or equal to x.

Figure 4:
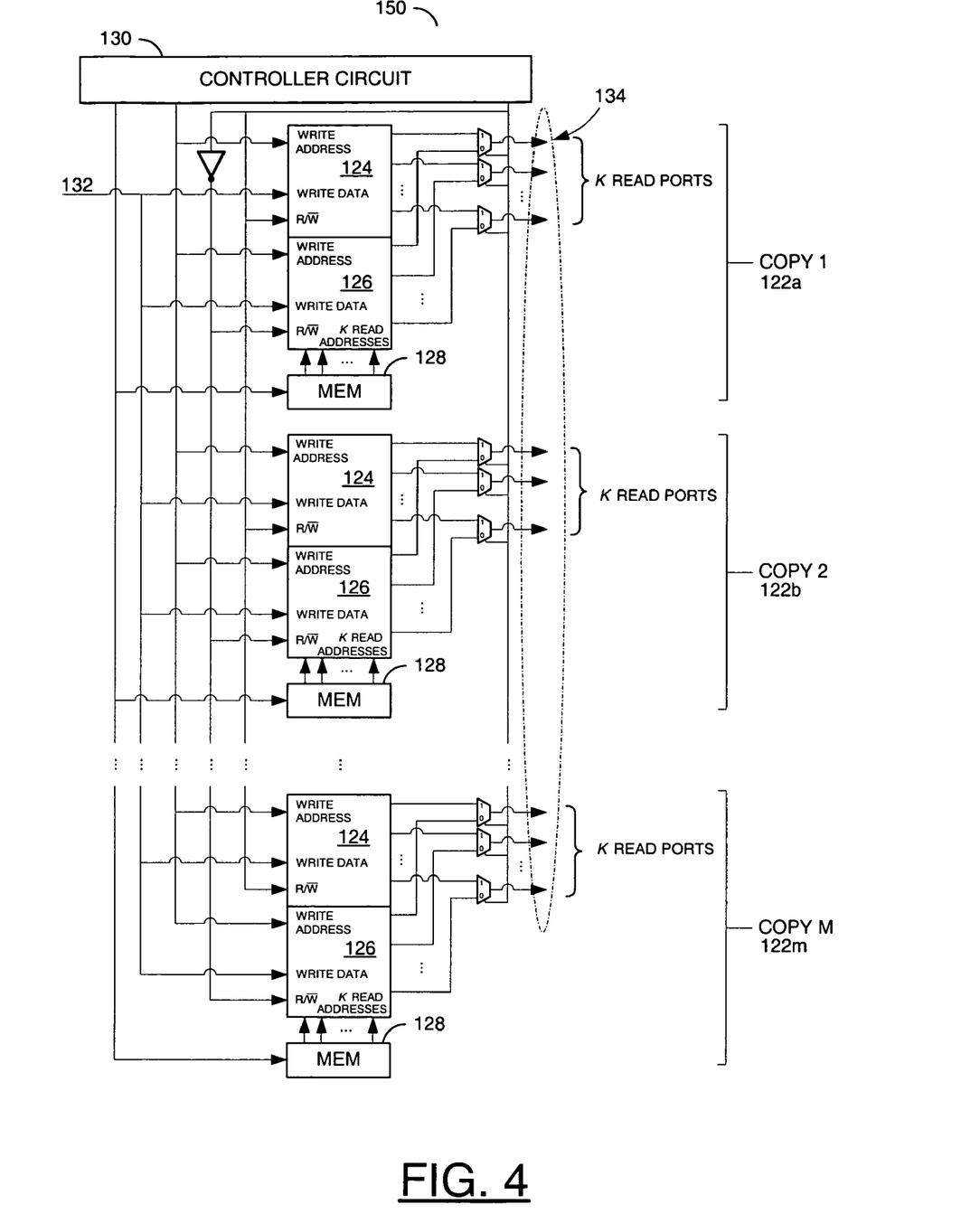
FIG. 4 is a block diagram of an example implementation of a second system comprising multiple switch core circuits.

Referring to FIG. 4, a block diagram of an example implementation of a second system 150 comprising multiple switch core circuits 122a-122m is shown. The system (or circuit) 150 generally comprises M switch core circuits 122a-122m, M memory circuits 128 and the controller circuit 130, where M is an integer greater than one. The switch core circuits 122a-122m may be similar to the switch core circuits 122, only with K read ports, where K<Q and MK=Q.

The switch core circuits 122a-122m are generally illustrated with a page from each of the buffer circuits 124 and 126. The other pages of the buffer circuits 124 and 126 are not shown for clarity. Each of the two pages of the same buffer circuit 124/126 generally share the same K read addresses and read data ports. Each copy of the switch core circuit 122a-122m is generally indexed by the connection map 138 (see FIG. 3). The TTMEM 136 and the connection map 138 may be used by the memory circuit 128 to generate K independent read addresses. All M copies of the memory circuits 128 generally share the same read address from the controller circuit 130. The read address is typically a counter indicating a current output time slot. Conventionally, each switch core circuit stores 90×8×2×P×N=1440PN bits of data from the received frames 100/110. The M switch core circuits may store 1440MPN bits of data from the received frames 100/110. For instance, to accommodate an 80 billion bits per second (Gbps) SONET tributary, a time-space switch having P=32 and STS-48 (N=48) input ports may store M×2,211,840 bits.

Figure 5:
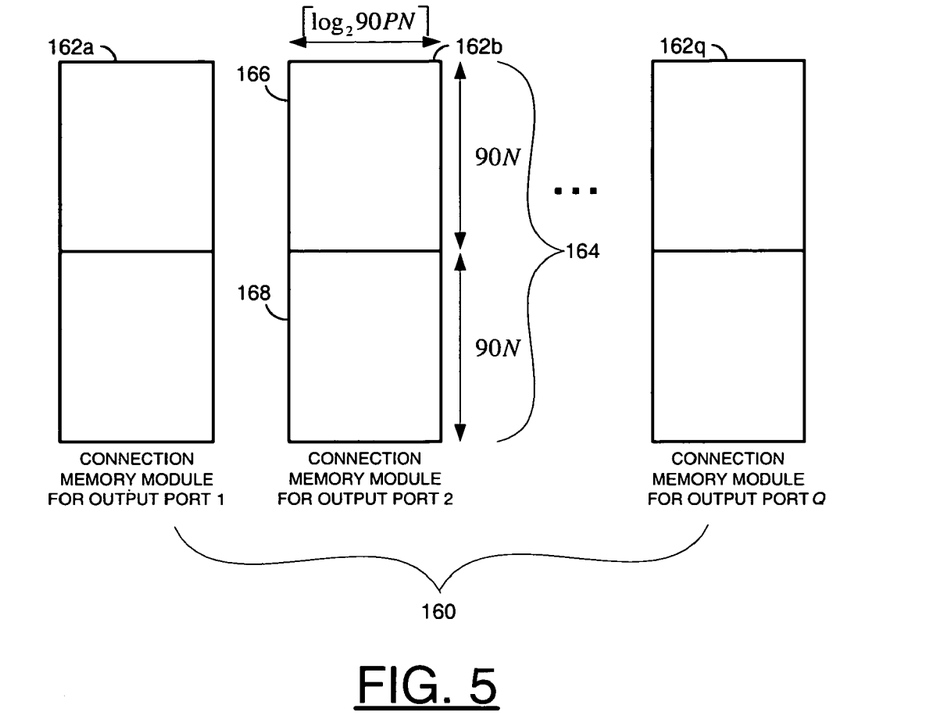
FIG. 5 is a block diagram of a connection map for the second system.

Referring to FIG. 5, a block diagram of a connection map 160 for the second system 150 is shown. The connection map 160 generally comprises multiple (e.g., Q) connection memory modules 162a-162q (Q instances of module 162a), one for each one of the Q output ports of the system 150. The connection memory modules 162a-162q may be individually referred to as a connection memory module 162. The read address of a connection memory module 162 for a particular output port generally corresponds to the output time slot for that port. For the system 150, 90N output time slots may exist for each output port and the controller circuit 130 may cycle through all 90N read addresses, one address per output time slot, repeatedly wrapping around to the beginning. To support hitless reconfiguration, whereby all SONET/SDH frames may be switched intact before and after the reconfiguration event, the connection memory modules 162a-162q may be double-buffered. Therefore, a reconfiguration event that sends part of a SONET/SDH frame 100/110 to one output time slot before the reconfiguration event and the rest of the frame 100/110 to a different output time slot after the event is not hitless. Half of the connection memory modules 162a-162q may be active while the other half may be on standby. While the controller circuit 130 reads the active connection map, a new set of connections may be substantially simultaneously written to the standby connection map. The controller circuit 130 generally swaps the active map and the standby map at the SONET/SDH frame boundary to achieve hitless reconfiguration. Thus, a conventional connection memory map may have 180N entries.

The output read address generated from the above connection memory map 160 may provide an input to a function generating the read address value for the switch core circuit 122. For the above system 150, 90PN addresses may exist, corresponding to 90PN input time slots to which an output time slot may be connected. The output data of the conventional connection memory modules are thus at least $\lceil \log_2 90PN \rceil$ bits wide. The total number of bits in the conventional connection map that has Q connection memory modules may thus be $180QN\lceil \log_2 90PN \rceil$ bits.

Figure 6:
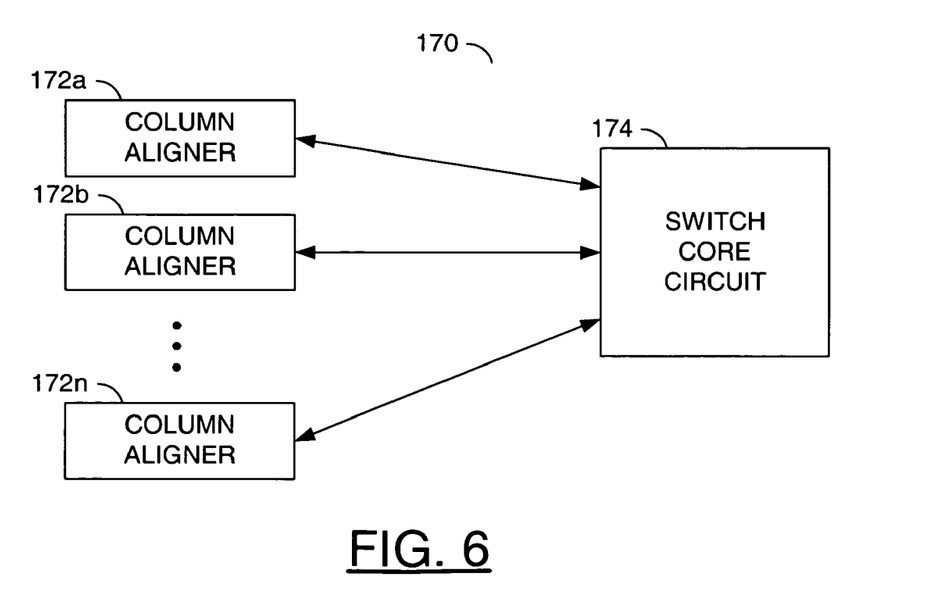
FIG. 6 is a block diagram of an example implementation of a SONET tributary switching system.

Referring to FIG. 6, a block diagram of an example implementation of a SONET tributary switching system 170 is shown. The system (or circuit) 170 generally comprises multiple circuits (or modules) 172a-172n and a circuit (or module) 174. The circuit 174 may be operational as a tributary switch core circuit. The tributary switch core circuit 174 may be similar to either the switch core circuit 122 or the switch core circuits 122a-122m.

The circuits 172a-172n may be referred to as column aligner circuits. The column aligner circuits 172a-172n may be operational to pre-align the synchronous payload envelope (SPE) in each STS-1/STM-0 frame before passing the SONET/SDH frame to the tributary switch core circuit 174. The exact location of the first byte of the SPE is generally immaterial since the first byte is the same among all SPE-aligned STS-1/STM-0 frames.

Figure 7:
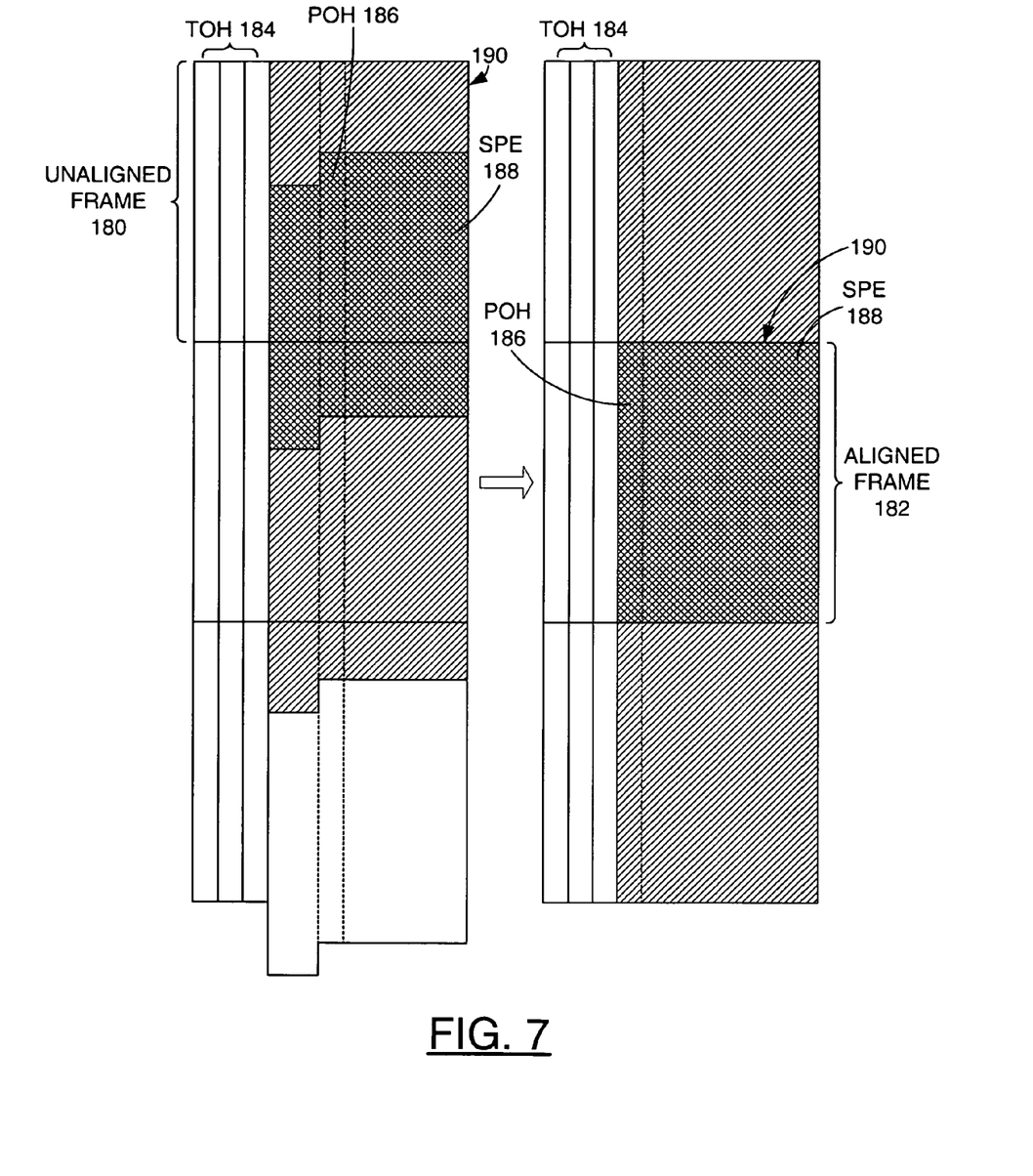
FIG. 7 is a diagram of an exemplary unaligned STS-1 frame and a resulting aligned STS-1 frame.

Referring to FIG. 7, a diagram of an exemplary unaligned STS-1 frame 180 and a resulting aligned STS-1 frame 182 are shown. The unaligned STS-1 frame 180 may have (i) the transport overhead (TOH) columns 184 (e.g., the first three columns of the frame) aligned as normal and (ii) the path overhead (POH) column 186 and other columns within the SPE 188 unaligned with an envelope capacity 190 (e.g., column 4 through column 90) inside the unaligned frame 180. The column aligner circuits 172a-172n may realign the columns in the envelope capacity 190 of the unaligned frame 180 such that the entire SPE 188 aligns with the envelope capacity 190 of the aligned frame 182. As such, the POH column 186 generally occupies the fourth column in the aligned frame 182.

Since each STS-1 frame has at most 28 tributaries (e.g., 28 VT1.5s), the tributaries may be interleaved in time and the temporal ordering of the tributary columns within a tributary payload may be fixed. For example, the tributary time-space switch circuit generally maintains the temporal ordering of the four columns within a particular VT2. Therefore, storing an entire row of a SONET frame in one page of the switch core circuit 122 before letting the controller circuit 130 read the data out may be unnecessary. While a conventional column switch core circuit is conceptually simple, the conventional switch core circuit provides flexibility that the SONET tributary time-space switch may not utilize, namely an ability to switch any input column to any output column. Instead, the present invention provides techniques that exploit SONET tributary switching patterns to lower memory usage in the connection map 138.

The present invention generally provides a memory-efficient connection map for tributary time-space switches. A tributary time-space switch, being a connection-oriented switch and comprising a plurality of inputs and a plurality of outputs, is capable of switching SONET/SDH tributary payloads both in space and in time according to the connectivity information stored in the connection map. According to one embodiment of the invention, a connection map comprising a plurality of memory modules containing compressed switching connectivity information generally reduces memory usage compared with conventional designs.

Referring again to FIG. 1, the tributary time-space switch 120/150/170 may maintain a temporal ordering of the columns within a tributary (e.g., VT or TU). For instance, the tributary time-space switch may prohibit (e.g., arrow 191) time-switching column 5 (e.g., column A1 in the first column of the VT 106a and in the first column of the VT group 104a) in the STS-1 frame 100 with column 34 (e.g., the column A2 in the second column of the VT 106a and in the fifth column of the VT group 104a) in either the same or another STS-1 frame. The prohibition generally prevents temporal reordering the columns belonging to a particular tributary regardless if the VT Group 104 carries only VT1.5s, VT2s, VT3s or a VT6s. A similar prohibition may be applied to the STM-0 frame 110.

The tributary time-space switch 120/150/170 may allow (e.g., arrows 192) time-switching columns within a particular group 104/114 where the temporal ordering among the switched columns remains unchanged. For example, columns A1, A2 and A3 in the tributary 106a may be switched respectively into columns B1, B2 and B3 of the same tributary 106a. Similarly allowed time-switches may be applied to the STM-0 frame 110. As such, the connection map 138 may only store sufficient data to switch a single column of a particular tributary. The tributary time-space switch may apply the data for the single column to all other columns within the particular tributary to maintain temporal ordering. Spending additional memory to specify where to switch the other columns in the particular tributary may be redundant and thus avoided.

Referring again to FIG. 2, the tributary time-space switch 120/150/170 may also allow (e.g., arrows 193) time-switching columns from a first group 104/114 to a second group 104/114 where the temporal ordering among the switched columns remains unchanged. For example, the columns A1, A2 and A3 in the TU group 114a may be switched respectively into columns Z1, X3 (four columns right of Z1) and Y4 (four columns right of X3) in the TU group 114b. Similarly allowed time-switches may be applied to the STS-1 frame 100.

Figure 8:
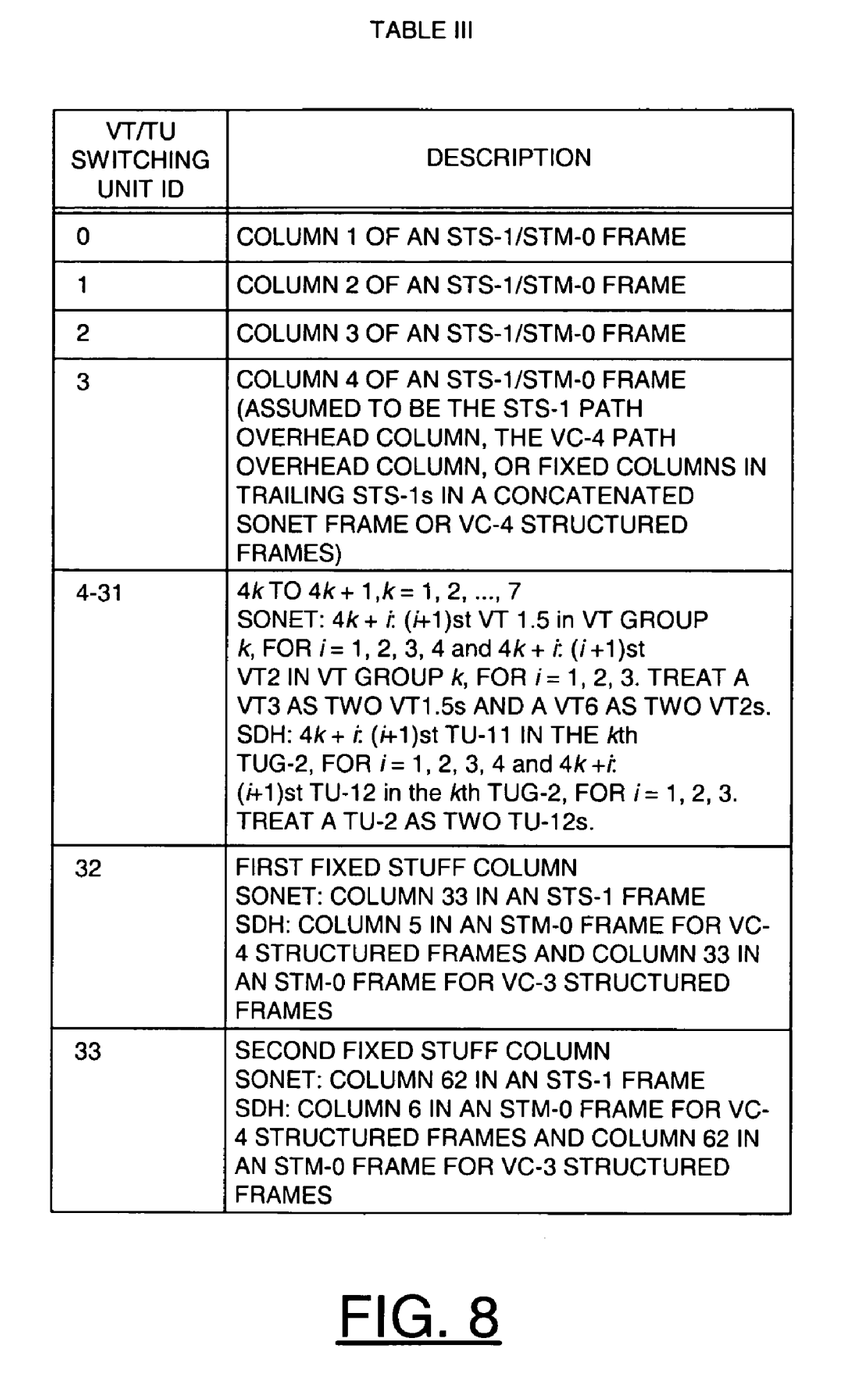
FIG. 8 is a table of an example tributary switching unit identifications.

Referring to FIG. 8, a TABLE III of an example tributary switching unit identifications (IDs) is shown. Rather than addressing each of the 90 columns individually in an STS-1/STM-0 frame when switching VTs/TUs, the present invention addresses at most 34 VT/TU switching units defined in TABLE III to completely address all VTs and TUs defined in the SONET and SDH standards. Addressing 34 VT/TU switching units, as opposed to conventionally addressing 90 columns, in an STS-1/STM-0 frame generally reduces the connection map 138 memory bit usage from $180QN\lceil \log_2 90PN \rceil$ bits to $68QN\lceil \log_2 34PN \rceil$ bits. Letting T be a number of unique VT/TU switching unit IDs, the memory bit usage of the connection map 138 may be given as $2TQN\lceil \log_2 TPN \rceil$ bits. The same VT/TU switching unit ID may be used for both SONET and SDH. However, the switch core address values are generally different between SONET and SDH frames. As such, the type of the VT/TU switching unit being manipulated should be identified.

Figure 9:
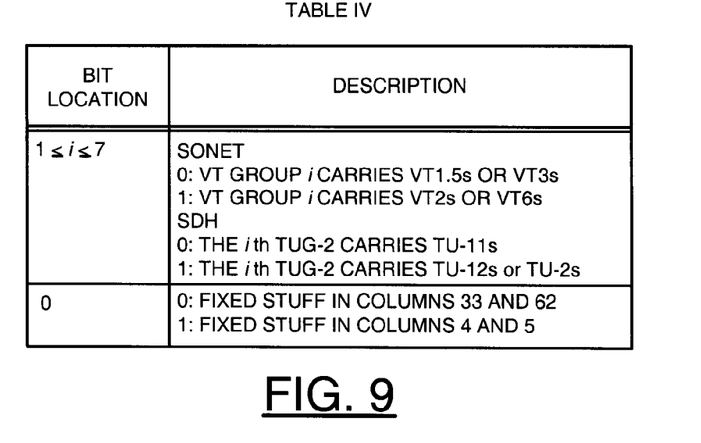
FIG. 9 is a table of a first example data field in a tributary type memory circuit.

Referring to FIG. 9, a TABLE IV of a first example data field in the TTMEM 136 is shown. The TABLE IV generally summarizes for each STS-1/STM-0 frame whether the frame is (i) a VT-structured SONET frame, (ii) a VC-3 structured SDH frame or (iii) a VC-4 structured SDH frame. For an STS-N frame, or equivalent frame, each output port generally contains one TTMEM 136 with 2N bytes. The factor of two supports double buffering for hitless reconfiguration.

Figure 10:
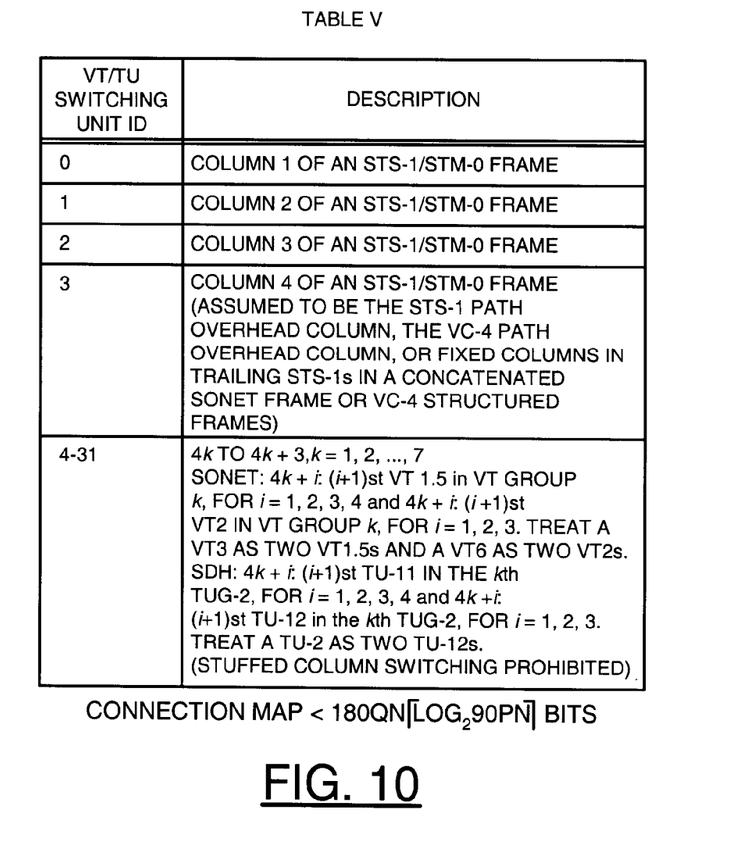
FIG. 10 is a table of a second example data field in the tributary type memory circuit.

Referring to FIG. 10, a TABLE V of a second example data field in the TTMEM 136 is shown. The TABLE V may be used to compress the connection map information further than TABLE IV. Since the fixed stuff columns are in either (i) columns 5 and 6 or (ii) columns 32 and 62, the stuff column information may be encoded in the TTMEM 136 and the tributary time-space switch prohibited from cross-connecting fixed stuff columns. As such, the output time slots corresponding to fixed stuff columns as specified in the TTMEM 136 may only connect to input time slots containing fixed stuff columns. The stuffed columns generally result in the input frame and the output frame to be similarly structured as the input and the output stuffed columns generally occupy the same time slots within a VC-3 or VC-4 frame. The number of bits in the connection map 138 generally decreases from 180QN⌈ $\log_2$90PN⌉ bits in the conventional approach to 64QN⌈ $\log_2$32PN⌉ bits (e.g., T=32).

Figure 11:
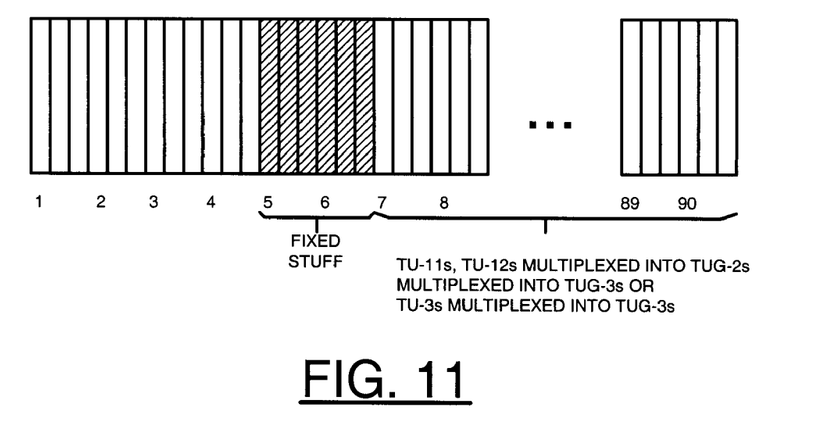
FIG. 11 is a diagram of a VC-4 structured STM-1 frame.

Referring to FIG. 11, a diagram of a VC-4 structured STM-1 frame is shown. The SDH generally specifies that four TU-11s, three TU-12s, or one TU-2 may be multiplexed into a TUG-2, seven of which may be multiplexed into either (i) a VC-3, which in turn may go into an (Administrative Unit) AU-3 or (ii) a TUG-3, three of which in turn may be multiplexed into a VC-4, which may go into an AU-4. In addition, one TU-3 may go into one TUG-3, three of which may be multiplexed into a VC-4, which then may go into an AU-4. Three AU-3s or one AU-4 may then go into an (Administrative Unit Group) AUG-1. In all cases, if the AUG-1 contains an AU-3, then the stuffed columns may occupy columns 33 and 62 using the equivalent SONET STS-1 column numbering in FIG. 1; otherwise, the AUG-1 contains an AU-4, in which case, the stuffed columns may occupy columns 5 and 6 (as shown in FIG. 11).

Figure 12:
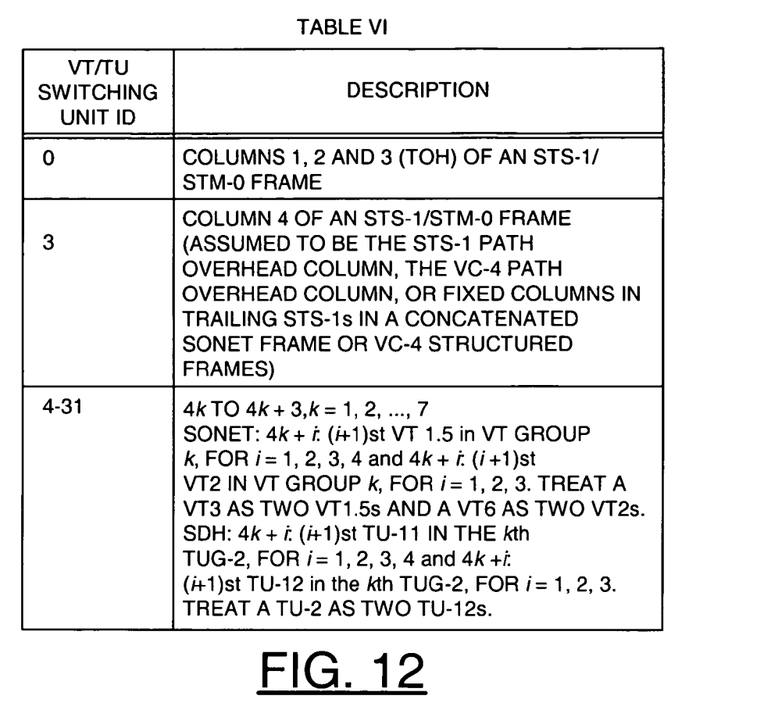
FIG. 12 is a table of a third example data field in the tributary type memory circuit.

Referring to FIG. 12, a TABLE VI of a third example data field in the TTMEM 136 is shown. The TABLE VI data may further compresses the connection map 138 by specifying the three transport overhead (TOH) columns 102 as a single VT/TU switch unit ID. The three columns may be well defined in the SONET and SDH standards and time-switching within the three columns may not be performed. The further enhancement brings the number of connection map 138 bits down to 60QN⌈ $\log_2$30PN⌉ bits (e.g., T=30).

Figure 13:
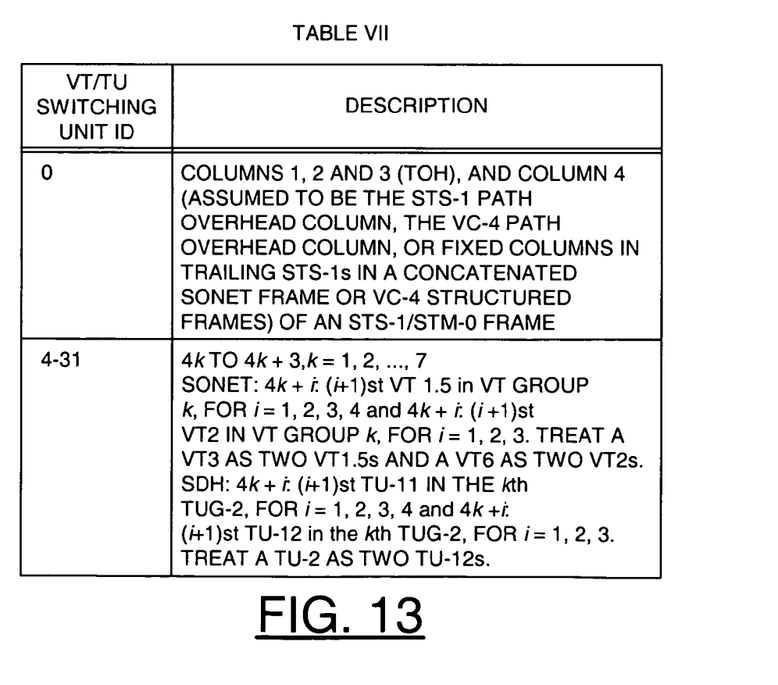
FIG. 13 is a table of a fourth example data field in the tributary type memory circuit.

Referring to FIG. 13, a TABLE VII of a fourth example data field in the TTMEM 136 is shown. As long as the path overhead (POH) columns are pre-aligned to the same time slot, assumed without loss of generality to be column 4, the POH and the TOH columns may be grouped together as a single VT/TU switch unit ID. Therefore, the connection map 138 may be further lowered to 58QN⌈ $\log_2$29PN⌉ bits (e.g., T=29).

Keeping T at or less than 32 generally prevents a width of the connection map 138 from growing an extra bit. The above discussion may bring T down to 29 by imposing constraints generally consistent with the SONET and SDH standards. Three extra VT/TU switching unit IDs may be available when T is reduced to 29 before the total number of unique VT/TU switching unit IDs reaches 32 (e.g., a 5-bit value). The extra VT/TU switching unit IDs may be used to signal other actions for the tributary time-space switch to perform. For example, one or more of the extra switching unit IDs may be defined as override indications.

Figure 14:
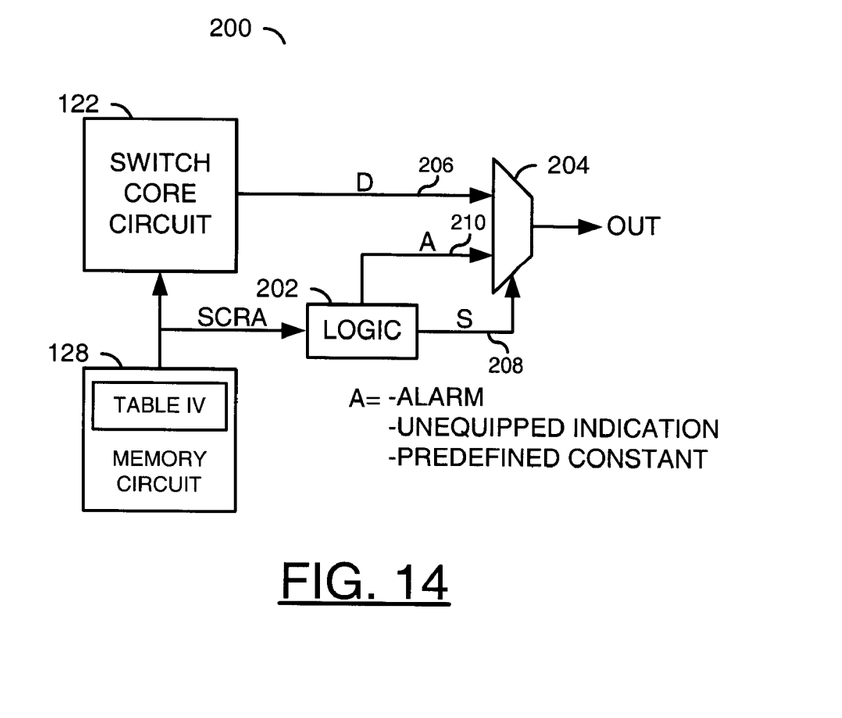
FIG. 14 is a diagram of an example implementation of a column override function in a system.

Referring to FIG. 14, a diagram of an example implementation of a column override function in a system 200 is shown. The system (or circuit) 200 generally comprises the switch core circuit 122, the memory circuit 128, a circuit (or module) and a multiplexer 204. The system 200 may be similar to the system 120 (FIG. 3) with the added circuit 202 and the added multiplexer 204. The tributary type information in TABLE IV may be stored, in the memory circuit 128.

The circuit 202 may be referred to as a logic circuit. The logic circuit 202 may be operational to generate a signal (e.g., A) in response to the signal SCRA. The signal A may carry a bit pattern a single column wide. The logic circuit 202 may also be operational to generate a signal (e.g., S) in response to the signal SCRA. The signal S may be referred to as a selection signal used to control the multiplexer 204.

When the VT/TU switching unit ID in the signal SCRA is one of the override IDs, the logic circuit 202 may generate the selection signal S on a link 208 such that the data coming out of the switch core circuit 122 in the data signal D on a link 206 may be ignored by the 2-to-1 multiplexer 204. Instead, the logic circuit 202 may generate an associated override byte in the signal A on a link 210. As such, the frame in the output signal OUT may convey one or more override patterns from the signal A in place of one or more columns of data received in the signal IN.

The extra IDs may be used for generating column overrides. The column overrides may be useful for encoding alarms and provisioning information into the outgoing stream of the signal OUT. For instance the three switching unit IDs for column overrides may define (i) an alarm, (ii) an unequipped indication and (iii) a predefined constant. The alarm condition may be indicated by a first predetermined pattern (e.g., all ones, hexadecimal FF). The unequipped condition may be used to indicate that the particular column (or time slot) being overridden is unequipped. The predefined constant may be used for user defined signaling purposes.

The present invention may implement SONET/SDH tributary addressing by first classifying the switching unit (set of columns in a SONET/SDH frame) into a transport overhead column (TOH), a path overhead column (POH), a fixed stuff column or a VT/TU. If the latter, reception of an STS-1 frame or an STM-0 frame may be identified (a particular column out of every N columns starting with the first column of an STS-N frame or an STM-N/3 frame for N no less than 3). The VT Group/TUG-2 may then be identified. Individual VTs/TUs may also be identified. The frame, group and tributary information may be encoded in a compressed connection map having a size no more than TQN⌈ $\log_2$TPN⌉ bits, where T is substantially below 90, by encoding locations of switching units (VTs and TUs) rather than individual columns in a SONET/SDH frame.

The structure of each STS-1/STM-0 frame may be identified to aid decoding of the compressed connection map with a decoder memory (also referred to as the TTMEM) of size 2N bytes to enable the connection map to encode locations of tributaries in a SONET/SDH frame, rather than addressing individual columns of each tributary. Location of fixed stuff columns may be encoded in the information stored in the TTMEM. The system may prohibit fixed stuff cross-connections. The fixed stuff columns from the input frame may be in the same place as in the output frame. As such, both the input frame and output frame may be similarly structured tributary SONET/SDH frames.

Entries may be added to the connection map to support column override to encode special signaling conditions such as (i) SONET/SDH path alarm indication signal, (ii) VT tributary alarm indication signal (AIS-V) and (iii) an unequipped path. Given additional conditions to be encoded in the connection map, the connection map size may be given as 2(T+C)QN⌈ $\log_2$(T+C)PN⌉ bits, where C may represent a number of the signaling conditions.

The transport overhead (TOH) columns may be switched as a single group of columns instead of three separate columns. The POH column may be switched separately from the TOH columns. Furthermore, the POH column and the TOH columns may be treated as a single group for switching purposes.

In one embodiment, the system may provide separate memory circuits for storing the compressed connection information (e.g., connection map 138) and the tributary type information (e.g., TTMEM 136). In another embodiment, both the compressed connection map data and the tributary type information may be stored in a single memory circuit (e.g., 128). The TTMEM information may also be put inside a compressed connection map.

The various signals of the present invention are generally "on" (e.g., a digital HIGH, or 1) or "of" (e.g., a digital LOW, or 0). However, the particular polarities of the on (e.g., asserted) and off (e.g., de-asserted) states of the signals may be adjusted (e.g., reversed) accordingly to meet the design criteria of a particular implementation. Additionally, inverters may be added to change a particular polarity of the signals. The present invention may also be implemented by the preparation of ASICs, FPGAs, or by interconnecting an appropriate network of conventional component circuits (such as conventional circuit implementing a state machine), as is described herein, modifications of which will be readily apparent to those skilled in the art(s). As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the spirit and scope of the invention.

The invention claimed is:

1. A method of switching a plurality of tributaries disposed among a plurality of time slots in a frame, comprising the steps of:
   (A) buffering said frame in a switch circuit;
   (B) switching said tributaries among said time slots in response to a read address; and
   (C) generating said read address in response to a plurality of identifications in a connection map, wherein (i) said identifications define data rearrangement among said time slots in said frame and (ii) said connection map has (a) a number of said identifications no greater than a maximum number of said tributaries in said frame plus one for a transport overhead of said frame and plus one for a path overhead of said frame and (b) less than $180QN\lceil \log_2 90PN \rceil$ bits, where P is a number of input ports of said switch circuit, Q is a number of output ports of said switch circuit and N is a number of either (1) SONET Synchronous Transport Signal, level-1 frames or (2) Synchronous Transport Module, level-0 frames in said frame.

2. A system comprising:
   a switch circuit configured to (i) buffer a particular frame comprising a plurality of time slots carrying a plurality of tributaries and (ii) switch said tributaries among said time slots in response a read signal; and
   a memory circuit configured to generate said read signal in response to a plurality of identifications in a connection map stored therein, wherein (i) said identifications define data rearrangement among said time slots in said frame and (ii) said connection map has (a) a number of said identifications no greater than a maximum number of said tributaries in said particular frame plus one for a transport overhead of said particular frame and plus one for a path overhead of said particular frame and (b) less than $180QN\lceil \log_2 90PN \rceil$ bits, where P is a number of input ports of said switch circuit, Q is a number of output ports of said switch circuit and N is a number of either (1) SONET Synchronous Transport Signal, level-1 frames or (2) Synchronous Transport Module, level-0 frames in said particular frame.

3. The system according to claim 2, wherein said memory circuit is further configured to store data specifying (A) said particular frame as one of (i) a Synchronous Optical Network frame and (ii) a Synchronous Digital Hierarchy frame and (B) said particular frame as one of (i) a Synchronous Optical Network frame having a virtual tributary structure, (ii) a Synchronous Digital Hierarchy frame having a virtual container-3 structure and (iii) said synchronous Digital Hierarchy frame having a virtual container-4 structure for use in switching each of said tributaries as a single unit.

4. A system comprising:
   means for buffering a plurality of tributaries disposed among a plurality of time slots in a frame;
   means for switching said tributaries among said time slots in response to a read address; and
   means for generating said read address in response to a plurality of identifications in a connection map, wherein (i) said identifications define data rearrangement among said time slots in said frame and (ii) said connection map has (a) a number of said identifications no greater than a maximum number of said tributaries in said frame plus one for a transport overhead of said frame and plus one for a path overhead of said frame and (b) less than $180QN\lceil \log_2 90PN \rceil$ bits, where P is a number of input ports of said means for buffering, Q is a number of output ports of said means for buffering and N is a number of either (1) SONET Synchronous Transport Signal, level-1 frames or (2) Synchronous Transport Module, level-0 frames in said frame.

5. A system comprising:
   a switch circuit configured to (i) buffer a frame comprising a plurality of time slots carrying a plurality of tributaries and (ii) switch said tributaries among said time slots in response a read signal; and
   a memory circuit configured to generate said read signal in response to a plurality of identifications in a connection map stored therein, wherein said connection map has less than $180QN\lceil \log_2 90PN \rceil$ bits, where P is a number of input ports of said switch circuit, Q is a number of output ports of said switch circuit and N is a number of either (i) SONET Synchronous Transport Signal, level-1 frames or (ii) Synchronous Transport Module, level-0 frames in said frame.

6. The system according to claim 5, wherein said frame comprises one of a Synchronous Optical Network frame and a Synchronous Digital Hierarchy frame.

7. The system according to claim 5, wherein said connection map has no greater than $68QN\lceil \log_2 34PN \rceil$ bits.

8. The system according to claim 5, wherein said connection map has no greater than $68QN\lceil \log_2 32PN \rceil$ bits.

9. The system according to claim 5, wherein said connection map has no greater than $60QN\lceil \log_2 30PN \rceil$ bits.

10. The system according to claim 5, wherein said memory circuit is further configured to store data in a tributary module specifying said frame as one of (i) a Synchronous Optical Network frame and (ii) a Synchronous Digital Hierarchy frame for use in switching each of said tributaries as a single unit.

11. The system according to claim 5, wherein said memory circuit is further configured to store data specifying said frame as one of (i) a Synchronous Optical Network frame having a virtual tributary structure, (ii) a Synchronous Digital Hierarchy frame having a virtual container-3 structure and (iii) said Synchronous Digital Hierarchy frame having a virtual container-4 structure for use in switching each of said tributaries as a single unit.

12. The system according to claim 5, further comprising:
   a logic block configured to generate a pattern signal and a selection signal in response to said read signal; and
   a multiplexer configured to multiplex said pattern signal and an output signal of said switch circuit in response to said selection signal.

13. The system according to claim 5, wherein said system is configured to prohibit switching of a first of said time slots within a particular tributary of said tributaries to a second of said time slots within said particular tributary.

14. The system according to claim 5, wherein said system is configured to prohibit switching of a stuffed pattern in a predetermined slot of said time slots.

15. A method of switching a plurality of tributaries disposed among a plurality of time slots in a frame, comprising the steps of:
   (A) buffering said frame in a switch circuit;
   (B) switching said tributaries among said time slots in response to a read address; and
   (C) generating said read address in response to a plurality of identifications in a connection map, wherein said connection map has less than $180QN\lceil \log_2 90PN \rceil$ bits, where P is a number of input ports of said switch circuit, Q is a number of output ports of said switch circuit and N is a number of either (i) SONET Synchronous Transport Signal, level-1 frames or (ii) Synchronous Transport Module, level-0 frames in said frame.

16. The method according to claim 15, wherein said frame comprises one of a Synchronous Optical Network frame and a Synchronous Digital Hierarchy frame.

17. The method according to claim 15, wherein said connection map has a number of said identifications no greater than a maximum number of said tributaries in said frame plus one for a transport overhead of said frame and plus one for a path overhead of said frame.

18. The method according to claim 15, wherein no greater than 28 of said identifications are used for switching said time slots.

19. The method according to claim 15, further comprising the step of:
   prohibiting switching of a first of said time slots within a particular tributary of said tributaries to a second of said time slots within said particular tributary.

20. The method according to claim 15, further comprising the step of:
   prohibiting switching of a stuffed pattern in a predetermined slot of said time slots.

21. The method according to claim 15, further comprising the step of:
   inserting a pattern into one of said time slots in response to said read address indicating a predetermined one of said identifications.

22. The method according to claim 15, wherein a single one of said identifications is associated with said time slots carrying a transport overhead of said frame and a path overhead of said frame.

23. The method according to claim 15, wherein at least one of said identifications is associated with an alarm condition.

24. The method according to claim 15, wherein at least one of said identifications specify that one of said time slots is unequipped.

25. The method according to claim 15, wherein at least one of said identifications is associated with a predefined constant associated with a signaling purpose.

* * * * *